June 21, 1966 B. J. SCHNITTJER 3,256,779
EXTENSIBLE BOOM

Filed June 1, 1964 2 Sheets-Sheet 1

INVENTOR.
BRADLEY J. SCHNITTJER

BY *James C. Nemmers*

ATTORNEY

June 21, 1966  B. J. SCHNITTJER  3,256,779
EXTENSIBLE BOOM
Filed June 1, 1964  2 Sheets-Sheet 2
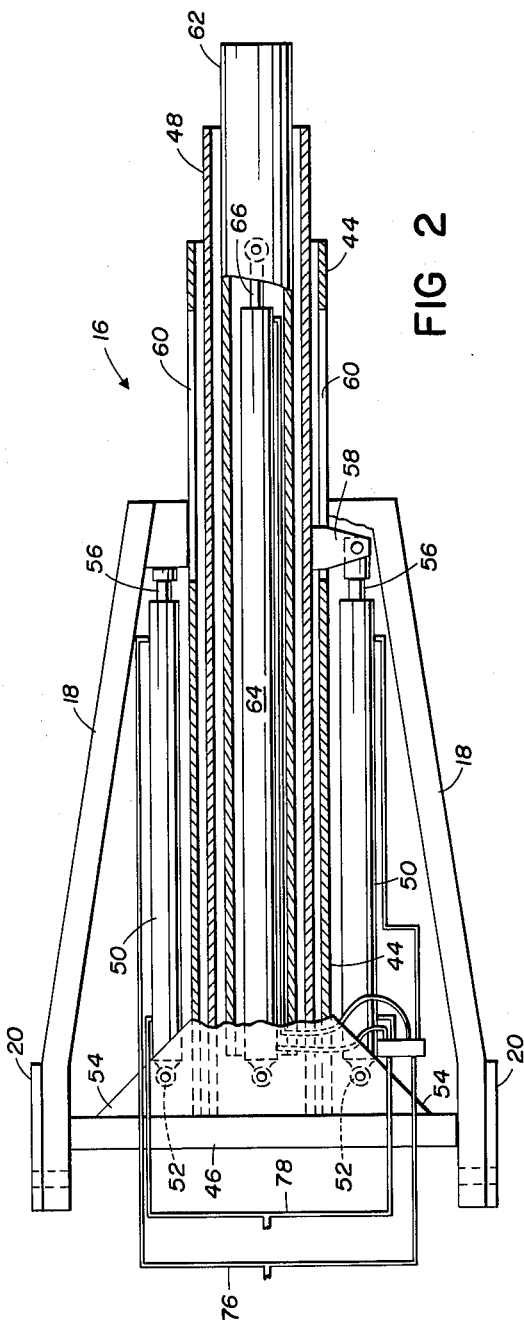
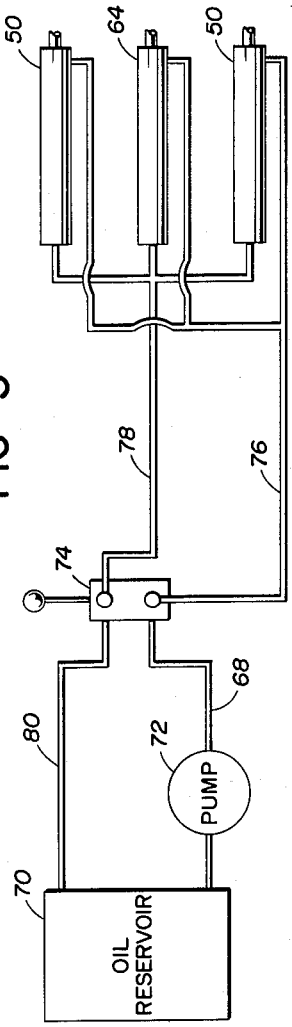
INVENTOR.
BRADLEY J. SCHNITTJER
BY
ATTORNEY

United States Patent Office 3,256,779
Patented June 21, 1966

---

3,256,779
EXTENSIBLE BOOM
Bradley J. Schnittjer, Box 266, Delhi, Iowa
Filed June 1, 1964, Ser. No. 371,612
4 Claims. (Cl. 91—167)

This invention relates to a boom and more specifically relates to an extensible boom particularly useful on relatively small mobile equipment such as rubber tire and crawler-type tractors.

Booms of all types mounted either on stationary supports or on vehicles have been used for many years to carry out a variety of operations. For example, booms with a hook attachment are useful in any situation where a load must be lifted. Buckets, draglines, clamshells, tampers, wrecking balls and other boom attachments are also employed to carry out well-known operations. Booms can be mounted on self-propelled and other mobile units or they can be installed on stationary supports. On mobile units, they may be mounted on the rear, side or front of the vehicle or equipment. Particularly in the smaller and more mobile types of equipment, a long boom limits the maneuverability of the equipment while it is being used for other purposes and also interferes with movement of the equipment from place to place. This is especially true where booms of extra length are employed, and in many prior art constructions, the boom is made in sections which can be disassembled and removed before the equipment is moved from one place to another. This procedure obviously is time consuming and inconvenient and sometimes requires the use of a separate vehicle to transport the boom sections which were removed from the equipment. In order to overcome these disadvantages, fluid-operated or hydraulically-actuated booms have been used in which the boom sections can be retracted. However, many of the prior art constructions of booms for mobile equipment do not retract into a compact assembly which will not interfere with the maneuverability and movement of the vehicle to which it is attached. Others that are compact when retracted are not extensible to a very great length, cannot be power retracted by the hydraulic system, or are expensive to manufacture and maintain.

It is therefore an object of the present invention to provide an improved extensible boom which can be power retracted into a compact unit when not in use and extended by power to a considerable length if desired. Accordingly, the present invention provides a multiple section, fluid-operated boom of very simple construction which can be extended and then retracted by power to a length substantially the same as the length of the main section. These and other features and objects of the invention will be readily apparent from a consideration of the following description of a preferred embodiment of the invention taken in connection with the accompanying drawings in which:

FIG. 2 is a top view of the boom with parts in section to show the interior details; and FIG. 3 is a diagrammatical view illustrating the hydraulic operating system for the boom.

Figure 1:
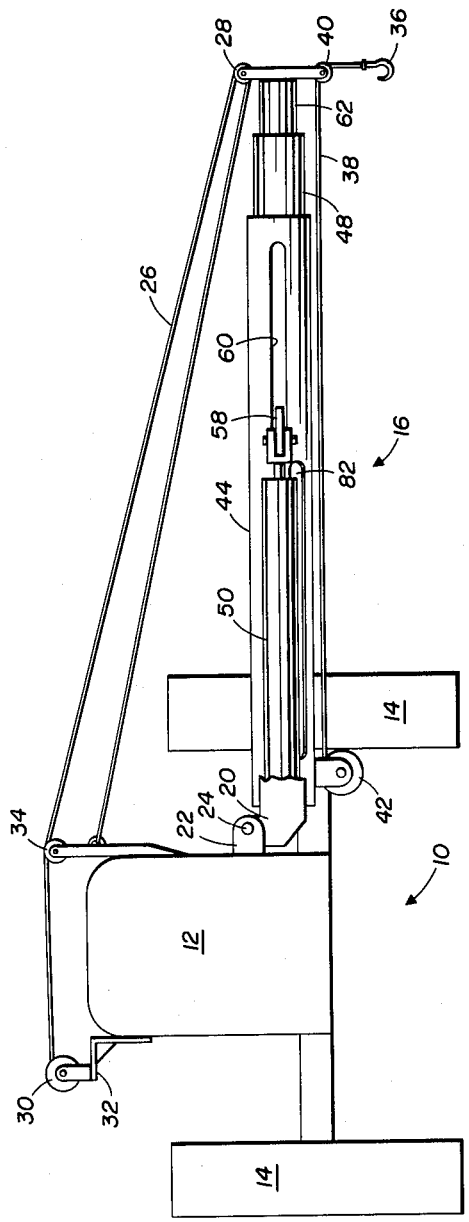
FIG. 1 is a side elevational view of the boom with part of the frame broken away, the boom being shown as mounted on the side of a small vehicle such as a tractor.

Referring first to FIG. 1, a tractor is indicated generally by the reference numeral 10, the tractor 10 having a main body 12 supported on a set of wheels 14. A boom, indicated generally by the reference numeral 16, has an "A"-shaped frame 18 with mounting brackets 20 affixed to the legs of the frame 18. In the embodiment shown in the drawings, the boom 16 is pivotally mounted on a supporting frame 22 that is affixed to the main body 12 of the tractor 10, the boom 16 being pivoted on pins 24 that pass through and connect the mounting brackets 20 and the frame 22.

The boom 16 is raised and lowered and held in the desired angular position by means of a boom cable 26 which is affixed at one end to the supporting frame 22. The cable 26 passes around a sheave 28 at the outer end and on top of the boom 16 and is wound around a winch 30 that is affixed to a supporting bracket 32 on the main body 12 of the tractor 10. The winch 30 is powered in any suitable manner, such as by a fluid-operated motor (not shown). If desired, a small guide pulley 34 can be affixed to the supporting frame 22 as shown in FIG. 1 to prevent fouling of the cable 26 when the boom 16 is in the lower angular positions.

A hook 36 or other attachment is affixed at the end of a load cable 38 which is passed around a load sheave 40 that is secured to the outer end of the boom 16 beneath the boom sheave 28. The other end of the load cable 38 is wound around a load winch 42 which may also be powered by a fluid-operated motor, for example. The load winch 42 is shown in FIG. 1 as affixed to the underside of the A-frame 18 but can be mounted directly on the main body 12 of the tractor 10 if desired.

The outer ends of the legs of the A-frame 18 are secured to the main section 44 of the boom 16, as is best seen in FIG. 2. The main section 44 of the boom 16 is a hollow tubular member which is affixed at its inner end to the cross member 46 of the A-frame 18. Received inside of the main setcion 44 at its outer end is the middle boom section 48 which is also preferably a hollow tubular member. As shown in FIG. 2, when the middle section 48 is fully retracted into the main section 44, the inner ends of the sections coincide. Thus, the full length of the main section 44 is utilized for retraction of the other sections. The middle section 48 is both extended and retracted by means of at least one and preferably a pair of double-acting hydraulic cylinders 50 one of which is shown as mounted on each side of the main boom section 44. Of course, a pair of opposed single-acting cylinders could be substituted in the illustrated embodiment for each one of the cylinders 50. The hydraulic cylinders 50 are affixed at one end to the A-frame 18 near the cross member 46 by means of pins 52 extending between a pair of gusset plates 54. Actuating rods 56 extend from the other end of the hydraulic cylinders 50 and are secured at their free ends to flanges 58 which are affixed to the middle boom section 48 and extend through elongated slots 60 in the sides of the main section 44. Slots 60 allow the middle section 48 to be extended and retracted by the hydraulic cylinders 50 which are mounted exteriorly of the boom sections. The slots 60, of course, are long enough to allow the middle section 48 to be fully extended and retracted. Also, the connections of the A-frame 18 to the main section 44 are such to provide clearance for passage of the flanges 58 as they are moved by rods 56.

Received in the outer end of the middle boom section 48 is the third or end section 62 of the boom 16. End section 62 is also preferably a hollow tubular member and telescopingly encloses a hydraulic cylinder 64. The inner end of cylinder 64 is affixed to the inner end of the middle boom section 48 and the actuating rod 66 of cylinder 64 is secured at its free end to the end section 62. As best seen in FIG. 2, when the end boom section 62 is fully retracted, its inner end is retracted almost to the inner end of the middle section 48. With both the middle section 48 and end section 62 of the boom 16 fully retracted, the boom 16 is not substantially longer than the main section 44. However, with both the middle section 48 and end section 62 fully extended within the limits of the illustrated design, the boom is approximately double the length of the main boom section 44.

In order to supply fluid to the hydraulic cylinders that operate the boom, a main supply line 68 is provided. The main line 68 is supplied from a reservoir 70 from which oil or other suitable fluid is pumped by pump 72 through a manually-operated control valve 74. The hydraulic cylinders 50 and 64 are preferably of the double-acting type thereby permitting the boom sections to be retracted as well as extended under controlled power in a single system. Thus, hydraulic fluid must be supplied to and exhausted from both ends of the cylinders. Branch line 76 carries fluid to and from one end of the hydraulic cylinders 50 and 64 while branch line 78 leads to the other end of the cylinders. A return line 80 to the reservoir 70 completes the circuit. Since the cylinder 64 moves with the middle boom section 48, an elongated slot 82 (FIG. 1) is provided in one side of the main boom section 44 to provide clearance for the hydraulic lines 76 and 78. As shown schematically in FIG. 3, lines 76 and 78 branch out through a manifold if desired, and are connected to each of the hydraulic cylinders at their respective ends.

The hydraulic system is a closed system and when fluid is supplied through the line 78 to extend the boom sections, fluid will be returned to the reservoir 70 through the line 76 and return line 80. Similarly, when the boom sections are to be retracted and the control valve 74 is actuated to supply hydraulic fluid to the cylinders through line 76, the fluid will be returned through the line 78 and return line 80 to the reservoir 70.

The manual control valve 74 provides the control extend the boom sections to any desired length and because the hydraulic cylinders 50 and 64 are the double-acting type, the boom sections can be held in any partially extended position as well as a fully extended or retracted position. It is unimportant which boom section is extended first, but with the arrangement shown, the middle section 48 is usually extended first carrying with it the end section which will be extended when the middle section 48 approaches its fully extended position.

It is evident that the boom construction of my invention provides a compact assembly when both the middle section 48 and end section 62 are fully retracted but permits the boom in the illustrated embodiment to be extended about double its retracted length. This is a very desirable feature particularly on mobile multi-purpose vehicles since the vehicle can be used for other purposes without disassembling or removing the boom. My novel construction also permits a load to be extended and retracted under power without raising or lowering the boom which makes the equipment very versatile in operation. The boom is easily attached to a carrier since the hydraulic lines can be provided with quick disconnect couplings and the load and winch cables easily disconnected.

Obviously, other modifications in specific structure of the preferred embodiment can be made. For example, the hydraulic cylinders 50 could be enclosed within the main boom section 44, but if this construction is employed, an interior tubular guide would have to be provided so that the middle section 48 could be retracted within the main section 44. Also, obviously, the boom sections could be made any desired cross sectional shape since it is not necessary to provide seals between the boom sections. In addition, friction reducing means such as rollers, etc., could be provided between the boom sections but I have not found this to be necessary.

Having thus described my invention, it will be obvious to those skilled in the art that various other revisions and modifications can be made to the construction shown in the preferred embodiment without departing from the spirit and scope of the invention. It is my intention, however, that any such revisions and modifications as are obvious to those skilled in the art will be included within the scope of the following claims.

I claim:

1. An extensible boom comprising a main section, means on the inner end of said main section for mounting the boom on a supporting structure, a middle section telescopingly mounted and longitudinally movable relative to said main section, an end section telescopingly mounted and longitudinally movable relative to said middle section, a first fluid operated cylinder connected to and movable with said middle section and having an actuating rod connected to said end section, a pair of fluid operated cylinders mounted exteriorly of said main section, each of the said pair of second cylinders having one end connected to the main section and an actuating rod extending from the other end and connected to said middle section, and means to supply fluid under pressure to said first and second cylinders to provide for extension and retraction of said middle and end sections.

2. The extensible boom of claim 1 in which said first and second cylinders are all of the double-acting type so that said end and middle sections can be both extended and retracted under power.

3. The extensible boom of claim 1 in which said middle section is telescopingly received inside of said main section, and said end section is telescopingly received inside of said middle section.

4. For use on a mobile piece of equipment having a hydraulic system and control means therefor, a three-section extensible boom comprising a main tubular boom section having means at its inner end to provide for connection to said equipment, a middle tubular boom section telescopingly received in said main section, an end tubular boom section telescopingly received in said middle section, a first double-acting hydraulic cylinder inside of said end section and having one end secured to the middle section and the other end secured to the end section, a second double-acting hydraulic cylinder mounted exteriorly of said main section and having one end connected to said main section and the other end connected to the middle section through an opening in said main section, said opening being longitudially elongated to provide for movement of said middle section by said second hydraulic cylinder relative to said main section, means for connecting said first and second hydraulic cylinders to said hydraulic system, and means to control the flow of hydraulic fluid to said cylinders to extend and retract said middle and end boom sections.

References Cited by the Examiner
UNITED STATES PATENTS
2,984,373   5/1961   Przybylski _____ 214—141

SAMUEL LEVINE, *Primary Examiner.*

P. T. COBRIN, *Assistant Examiner.*